(12) United States Patent
Shitou et al.

(10) Patent No.: US 9,201,260 B2
(45) Date of Patent: Dec. 1, 2015

(54) LIQUID CRYSTAL DISPLAY DEVICE AND PRODUCTION METHOD THEREOF

(71) Applicant: Japan Display Inc., Tokyo (JP)

(72) Inventors: Shigemi Shitou, Tokyo (JP); Shoji Furuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 156 days.

(21) Appl. No.: 14/077,663

(22) Filed: Nov. 12, 2013

(65) Prior Publication Data

US 2014/0132857 A1 May 15, 2014

(30) Foreign Application Priority Data

Nov. 15, 2012 (JP) ................... 2012-250819

(51) Int. Cl.
*G02F 1/1335* (2006.01)
*G02F 1/1333* (2006.01)

(52) U.S. Cl.
CPC ........ *G02F 1/13338* (2013.01); *G02F 2202/28* (2013.01)

(58) Field of Classification Search
CPC .......................... G02F 1/13338; G02F 2202/28
See application file for complete search history.

(56) References Cited

U.S. PATENT DOCUMENTS

| 2004/0085492 | A1* | 5/2004 | Saitoh ............................. 349/65 |
| 2009/0283211 | A1* | 11/2009 | Matsuhira .................. 156/275.7 |
| 2012/0026102 | A1* | 2/2012 | Chang et al. .................. 345/173 |
| 2013/0034713 | A1* | 2/2013 | Busman et al. ............... 428/217 |

FOREIGN PATENT DOCUMENTS

| JP | 2008-129159 A | 6/2008 |
| JP | 2010-66711 A | 3/2010 |

* cited by examiner

*Primary Examiner* — Michael Caley
(74) *Attorney, Agent, or Firm* — Ulmer & Berne LLP

(57) ABSTRACT

A method of producing a display device includes: applying a UV curing resin, in a rectangular pattern with openings at four corners thereof, to a part outside of an effective display region of an adherend surface of either one of a front panel and a display panel; irradiating the UV curing resin with UV rays to effect tentative curing thereof, thereby forming a dam pattern; applying a UV curing resin to an adherend surface of the other of the front panel or the display panel; adhering the one panel and the other panel to each other; irradiating, with respect to the one panel and the other panel adhered to each other, four corner areas where the dam pattern has not been formed; and irradiating the one panel and the other panel adhered to each other with UV rays to effect full curing of the UV curing resins.

16 Claims, 8 Drawing Sheets

(A)

(B)

FIG. 6
(A)
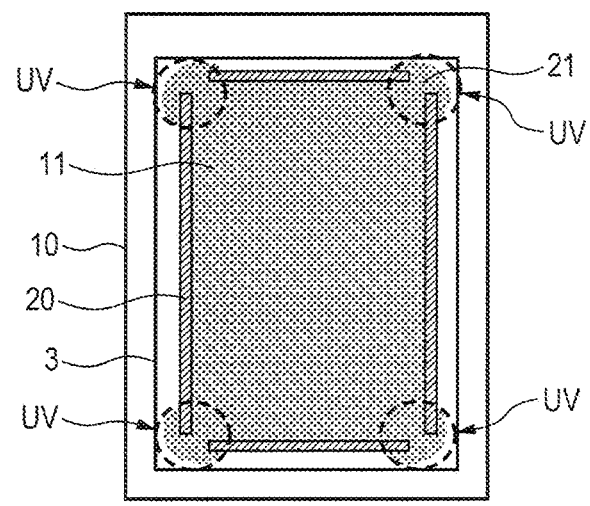
(B)
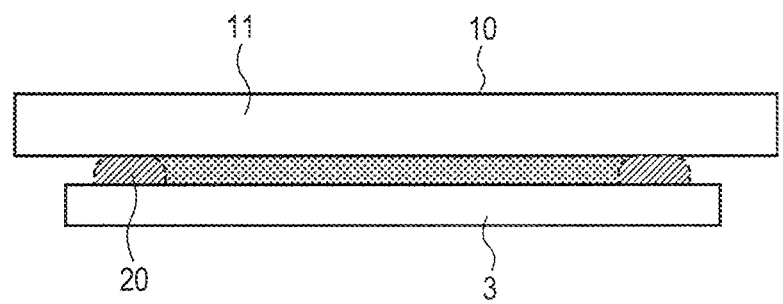

-- PRIOR ART --

-- PRIOR ART --

LIQUID CRYSTAL DISPLAY DEVICE AND PRODUCTION METHOD THEREOF

CLAIM OF PRIORITY

The present application claims priority from Japanese patent application JP2012-250819 filed on Nov. 15, 2012, the content of which is hereby incorporated by reference into this application.

BACKGROUND

The present invention relates to a display device and a method of producing a display device. More particularly, the invention relates to a technology for adhering a front panel or a touch panel by using a UV curing resin.

In a liquid crystal display device, a front panel (also referred to as cover glass, from window, or protection panel) is disposed on the front side of a liquid crystal display panel. The front panel is formed by use of glass or a transparent resin such as acrylic resin or carbonate resin.

If a space or gap is present between the front panel and the liquid crystal display panel, visibility of images would be worsened because of reflection of light on an interface of the front panel. In view of this, the front panel is adhered to the front surface of the liquid crystal display panel by use of a UV curing resin which is comparable to glass in refractive index.

FIG. 9 illustrates a method of adhering together a front panel and a liquid crystal display panel in a liquid crystal display device according to the related art.

As shown in FIG. 9, in the liquid crystal display device according to the related, art, the UV curing resin is applied to the front panel by a dispenser (step 101).

Next, the front panel and the liquid crystal display panel are adhered to each other (step 102), and then tentative curing of the UV curing re:sin is conducted (step 103) followed by full curing of the resin (step 104).

SUMMARY

FIGS. 10A and 10B illustrate the front panel and the liquid crystal display panel as adhered to each other by the method illustrated in FIG. 9. Specifically, FIG. 10A shows the front panel and the liquid crystal display panel in the mutually adhered state, as viewed from above, and FIG. 10B is a sectional view taken alone line A-A' of FIG. 10A for snowing a sectional structure.

In FIGS. 10A and 10B, numeral 10 denotes a front panel, 3 a liquid crystal display panel, and 11 a UV curing resin.

In step 101 in FIG. 9, the UV curing resin 11 is applied to the front panel 10 by use of a dispenser. T hen, in step 102 of FIG. 9, the front panel 10 and the liquid crystal display panel 3 are adhered to reach other, followed by allowing the UV curing resin 11 to spread in a wetting manner.

In this instance, as shown in FIG. 10B, an overflow of the UV curing resin 11 to the outside of the liquid crystal display panel 3 may occur, depending on the arrangement of the pattern of application of the resin, variations in the thicknesses of the members, parallelism of the members, and the like factors. As a result, there would occur deposition of the UV curing resin 11 onto a groups of optical sheets in a backlight unit or deposition of dirt due to movement of the assembly during handling thereof. Therefore, the overflowed portions of the UV curing resin rust be removed by cleaning.

Thus, there might be an increase in the number of working steps due to the above-mentioned work, or generation of defective products due to variations concerning the cleaning work. Accordingly, there is a demand for prevention of an overflow of the UV curing resin from occurring.

JP-A-2008-129159 contains a description that "a frame member is formed from a UV curing resin sheet, and an overflow of a UC-curing resin inside the frame member is thereby prevented from occurring."

In addition, JP-A-2010-66711 describes that "a dam pattern is formed by use of a UV curing resin having a high viscosity, then the resin is cured, and adhesion of members is conducted in such a manner that an overflow of a UV curing resin from inside the dam pattern is prevented from occurring."

However, the methods described in JP-A-2008-129159 and JP-A-2010-66711 have a problem that if a bubble or bubbles are mixed into a UV curing resin at the time of applying the UV curing resin to an area inside "the frame member formed from a UV curing resin sheet" or inside the "dam pattern formed by use of a UV curing resin," the bubbles cannot be removed, so that visibility of images would be worsened.

The present invention has been made in order to solve the above-mentioned problem involved in the related art. Accordingly concerning a display device and a production method thereof, the present invention aims to prevent visibility of images from being worsened due to mixing-in of a bubble or bubbles into a UV curing resin and, also to prevent an overflow of the UV curing resin from occurring, when a front panel or a touch panel is adhered to a display panel by use of the UV curing resin.

The above and other objects and novel features of the present invention will become apparent from the description in this specification and the accompanying drawings.

Of the inventions disclosed herein, some typical ones will be briefly summarized as follows.

(1) A display device includes a front panel and a display panel, which are adhered to each other by a UV curing resin. In the display device, the UV curing resin has oozed outward in a circular form in each of four corner areas of the display panel, and the UV curing resin has not oozed out toward the outside of the display panel, in other areas than the four corner areas of the display panel.

(2) A display device includes a touch panel and a display panel, which are adhered to each other by a UV curing resin. In the display device, the UV curing resin has oozed outward in a circular form in each of four corner areas of the display panel, and the UV curing resin has not oozed out toward the outside of the display panel, in other areas than the four corner areas of the display panel.

(3) A display device includes a front panel, a touch panel, and a display panel, and the front panel and the touch panel are adhered to each other by a UV curing resin. In the display device, the UV curing resin has oozed outward in a circular form in each of four corner areas of the touch panel, and the UV curing resin has not oozed out toward the outside of the touch panel, in other areas than the four corner areas of the touch panel.

(4) A method of producing a display device having a front panel, and a display panel, which are adhered to each other by a UV curing resin. The method includes: step 1 of applying a UV curing resin, in a rectangular pattern with openings at four corners thereof, to a part outside of an effective display region of an adherend surface of either one of the front panel and the display panel; step 2 of irradiating the UV curing resin applied in the step 1 with UV rays to effect tentative curing of the UV curing resin applied in the step 1, thereby forming a dam pattern; step 3 of applying a UV curing resin to an adherend surface of the other of the front panel or the display panel; step 4 of adhering the one panel and the other panel to each other; step 5 of irradiating, with respect to the one panel and the other panel adhered to each other in the step 4, four corner areas where the dam pattern has not been formed in the step 2 with UV rays to effect tentative curing of the UV curing resin applied in the step 3; and step 6 of irradiating the one panel and the other panel adhered to each other in the step 4 with UV rays to effect full curing of the UV curing resins.

(5) A method of producing a display device having a touch panel and a display panel, which are adhered to each other by a UV curing resin. The method includes: step 1 of applying a UV curing resin, in a rectangular pattern with openings at four corners thereof, to a part outside of an effective display region of an adherend surface of either one of the touch panel and the display panel; step 2 of irradiating the UV curing resin applied in the step 1 with UV rays to effect tentative curing of the UV curing resin applied in the step 1, thereby forming a dam pattern; step 3 of applying a UV curing resin to an adherend surface of the other of the touch panel or the display panel; step 4 of adhering the one panel and the other panel to each other; step 5 of irradiating, with respect to the one panel and the other panel adhered to each other in the step 4, four corner areas where the dam pattern has not been formed in the step 2 with UV rays to effect tentative curing of the UV curing resin applied in the step 3; and step 6 of irradiating the one panel and the other panel adhered to each other in the step 4 with UV rays to effect full curing of the UV curing resins.

(6) A method of producing a display device having a front panel, a touch panel and a display panel, and the front panel and the touch panel are adhered to each other by a UV curing resin. The method includes: step 1 of applying a UV curing rein, in a rectangular pattern with openings at four corners thereof, to a part outside of an effective display region of an adherend surface of either one of the front panel and the touch panel; step 2 of irradiating the UV curing resin applied in the step 1 with UV rays to effect tentative curing of the UV curing resin applied in the step 1, thereby forming a dam pattern; step 3 of applying a UV curing resin to an adherend surface of the other of the front panel or the touch panel; step 4 of adhering the one panel and the other panel to each other; step 5 of irradiating, with respect to the one panel and the other panel adhered to each other in the step 4, four corner areas where the dam pattern has not been formed in the step 2 with UV rays to effect tentative curing of the UV curing resin applied in the step 3; and step 6 of irradiating the one panel and the other panel adhered to each other in the step 4 with UV rays to effect full curing of the UV curing resins.

(7) According to the method of any of the above paragraphs (4) to (6), the height of the dam pattern formed in the step 2 is greater than the adhesion gap length between the one panel and the other panel, and a relation of $1.15 \times Hp \leq Ho \leq 1.25 \times Hp$ is satisfied, where Ho is the height of the dam pattern formed in the step 2, and Hp is the adhesion gap length between the one panel and the other panel.

(8) According to the method of any of the above paragraphs (4) to (6), the step 3 is a step of applying the UV curing resin to the adherend surface of the other panel in a pattern of dots. In the step 3, the area of the dot of the UV curing resin applied to a nearly central area of the adherend surface of the other panel is the largest, and the area of a dot of the UV curing resin applied to the adherend surface of the other panel is smaller as the dot is located farther from the center of the adherend surface.

Of the inventions disclosed herein, typical ones have the effects briefly described as follows.

According to the present invention, it is made possible, concerning a display device and a production method thereof, to prevent visibility of images from being worse due to mixing-in of a bubble or bubbles into a UV curing resin and, also, to prevent an overflow of the UV curing resin from occurring, at the time when a front panel or a touch panel is adhered to a display panel by use of the UV caring resin.

These features and advantageous of the invention will be apparent from the following more particular description of preferred embodiments of the invention, as illustrated in the accompanying drawings.

BRIEF DESCRIPTION OF THE DRAWINGS

FIGS. 6A and 6B illustrate in detail the method of adhering together the front panel and the liquid crystal display panel, in the liquid crystal display device according to the embodiment of the invention;

DESCRIPTION OF THE PREFERRED EMBODIMENTS

Figure 1:
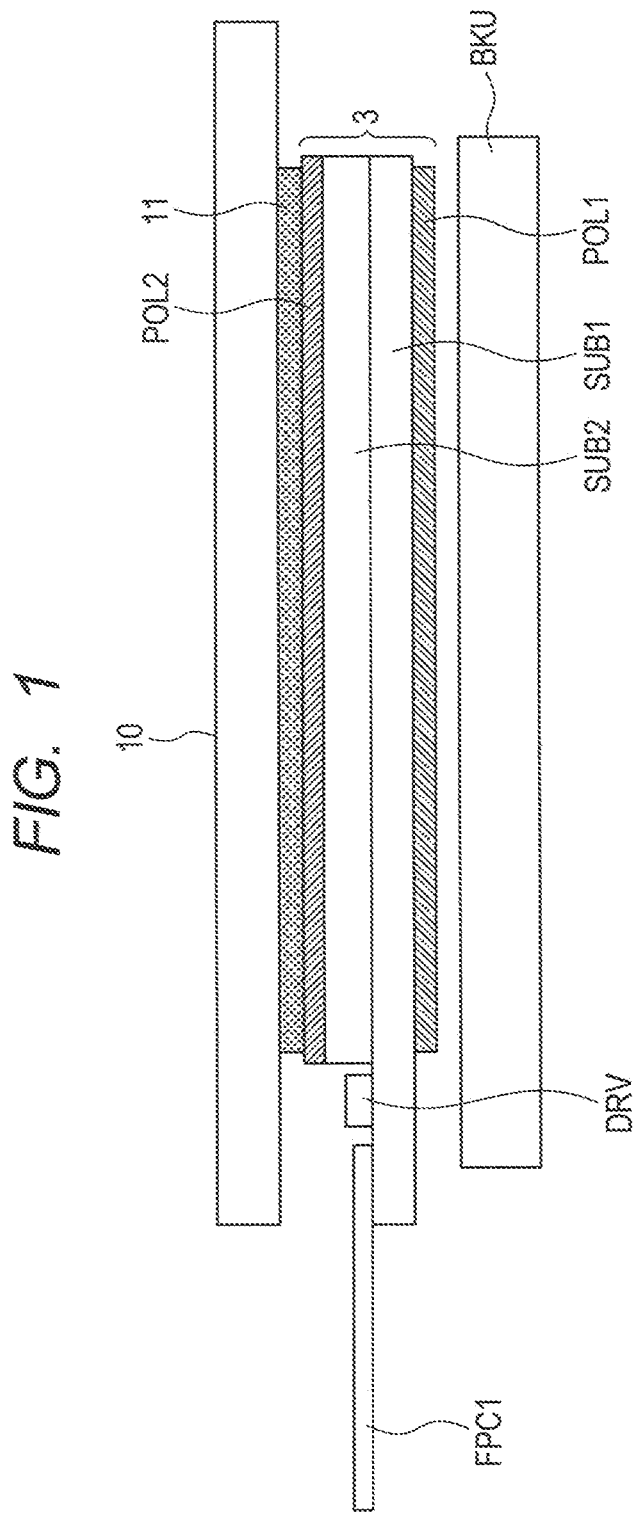
FIG. 1 is a side view showing a general configuration of a liquid crystal display device according to an embodiment of the present invention.

Now, an embodiment of the present invention will be described in detail below referring to the drawings.

Incidentally, in all the drawings for illustrating the embodiment, the components or parts having the same or equivalent function are denoted by the same reference sign, and repeated descriptions of those components or parts will be omitted. Besides the following embodiment is not intended to restrict the interpretation of the scope of the claims of the invention.

FIG. 1 is a side view showing a general configuration of a liquid crystal display device according to an embodiment of the present invention.

As shown in FIG. 1, the liquid crystal display device in this embodiment includes a liquid crystal display panel 3 and a backlight unit BKU.

The liquid crystal display panel 3 includes a first substrate (referred to also as TFT substrate) SUB1, a second substrate (referred to also as CF substrate) SUB2, and a liquid crystal layer (not shown) sealed in between the first substrate SUB1 and the second substrate SUB2.

A lower-side polarizing plate POL1 is adhered to the first substrate SUB1, and an upper-side polarizing plate POL2 is adhered to the second substrate SUB2.

A drive circuit DRV is mounted on that portion of the first substrate SUB1, which does not overlap with the second substrate SUB2. Display data and display control signals are inputted to the drive circuit DRV through a printed-wiring board FPC1.

In the liquid crystal display device according in this embodiment, a front panel 10 is adhered to the upper-side polarizing plate POL2 of the liquid crystal display panel 3 by a UV curing resin 11.

Figure 2:
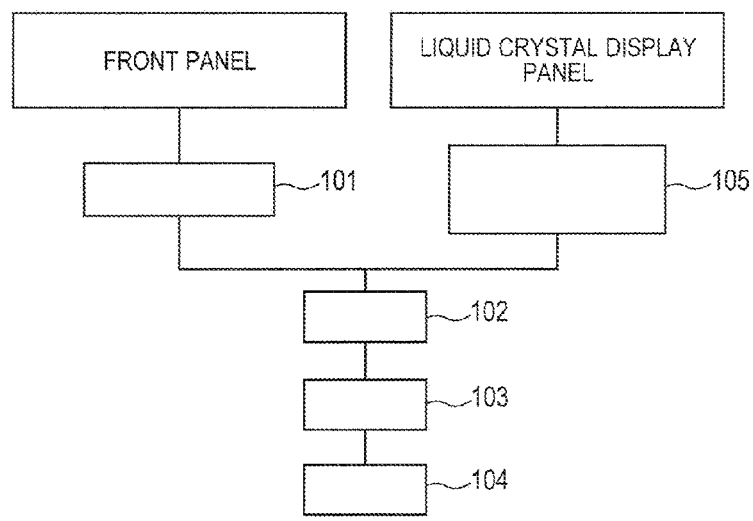
FIG. 2 illustrates a method of adhering together a front panel and a liquid crystal display panel, in the liquid crystal display device according to the embodiment of the invention.

FIG. 2 illustrates a method of adhering together the front panel 10 and the liquid crystal display panel 3, in the liquid crystal display device according to the embodiment of the present invention.

In the liquid crystal display device of this embodiment, first, a UV curing resin is applied to the front panel 10 by use of a dispenser (step 101).

Simultaneously, a UV curing resin is applied to a region outside of an effective display region on the upper-side polarizing plate POL2 or the liquid crystal display panel 3 by use of a dispenser, and is subjected to tentative curing, to form a dam pattern in a rectangular shape with openings at four corners thereof (step 105).

Next, the front panel 10 and the liquid crystal display panel 3 are adhered to each other (step 102), then the UV curing resin applied in the step 101 is subjected to tentative curing (step 103), and full curing of the UV curing resins is conducted (step 104).

Figure 3:
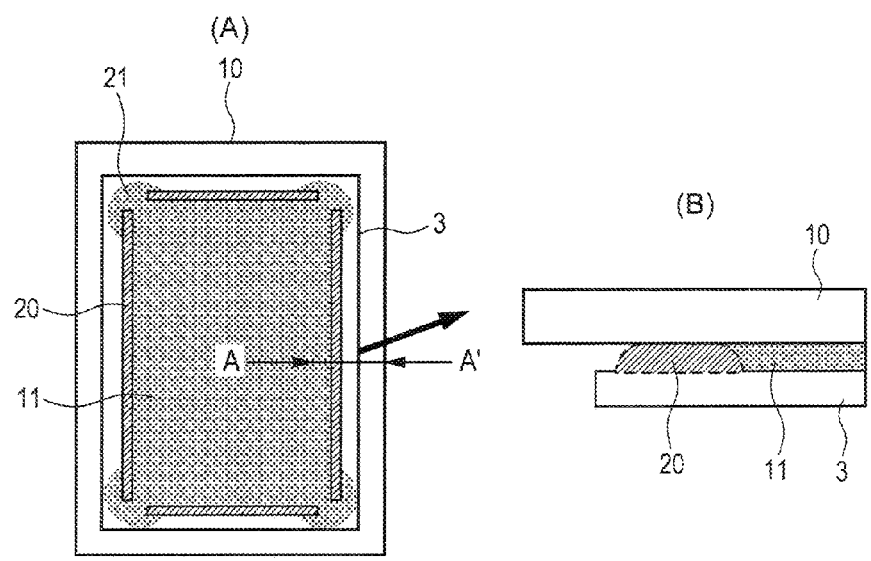
FIGS. 3A and 3B illustrate the front panel and the liquid crystal display panel as adhered to each other by the method illustrated in FIG. 2.
Figure 4:
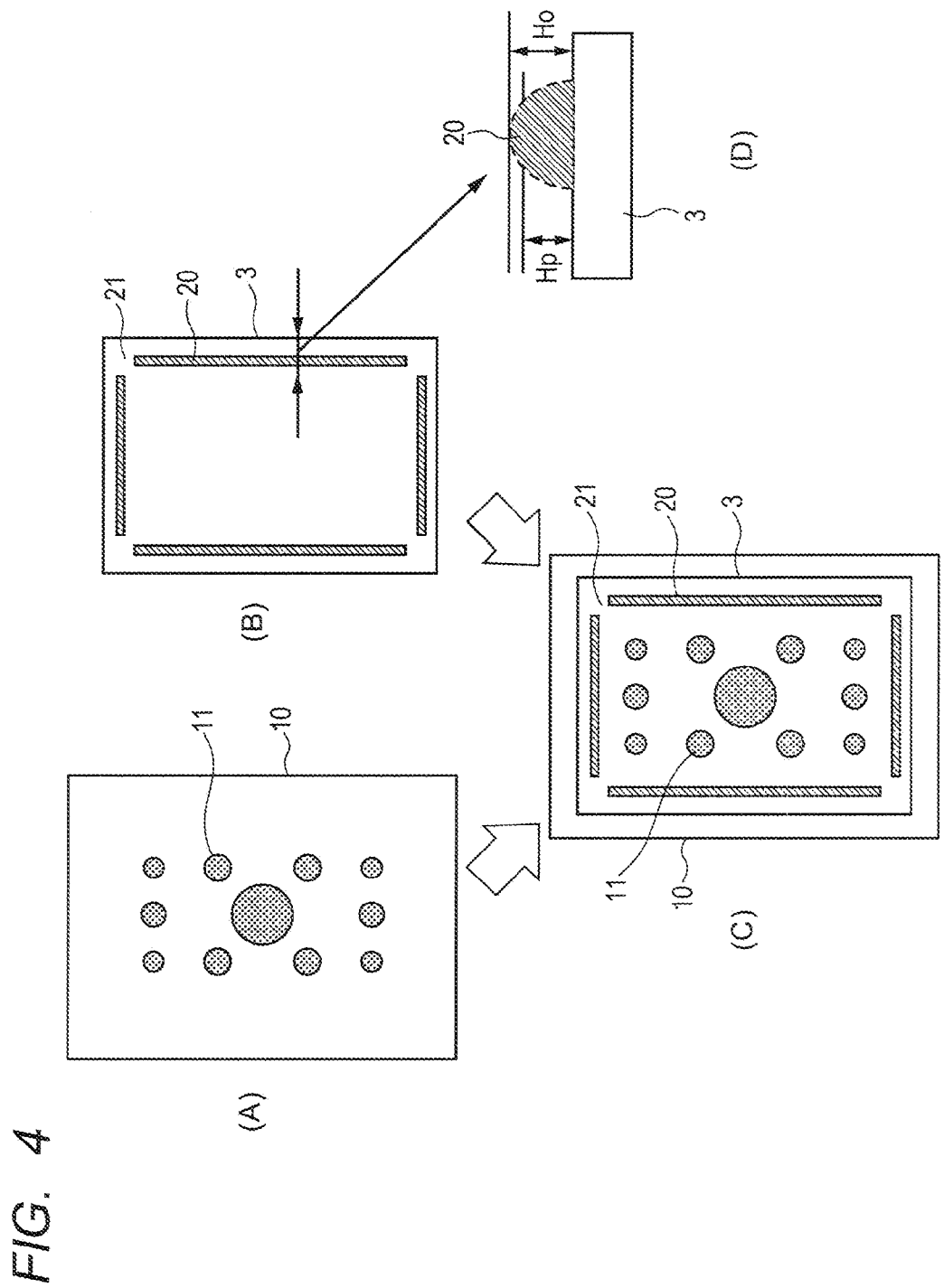
FIGS. 4A to 4D illustrate in detail the method of adhering together the front panel and the liquid crystal display panel, in the liquid crystal display device according to the embodiment of the invention.
Figure 5:
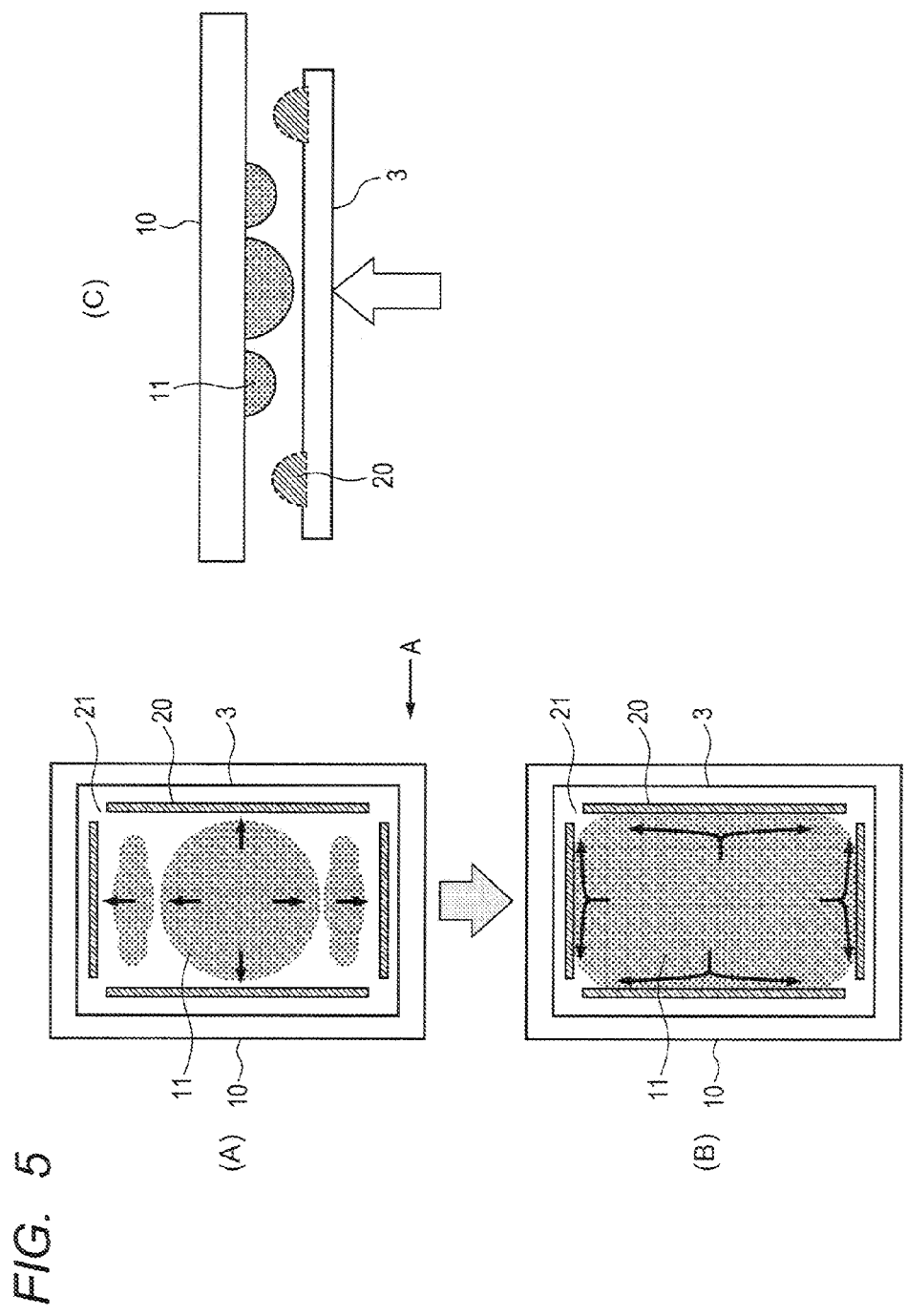
FIGS. 5A to 5C illustrate in detail the method of adhering together the front panel and the liquid crystal display panel, in the liquid crystal display device according to the embodiment of the invention.

FIGS. 3A and 3B illustrate the front panel 10 and the liquid crystal display panel 3 as adhered to each other by the method illustrated in FIG. 2. Specifically, FIG. 3A shows the front panel 10 and the liquid crystal display panel 3 adhered to each other, as viewed from above; FIG. 3B is a sectional view taken along line A-A' of FIG. 3A, for showing a sectional structure.

In this embodiment, the dam pattern 20 is formed in the step 105 in FIG. 2. At the time of adhering the front panel 10 and the liquid crystal display panel 3 in the step 102 in FIG. 2, therefore, the UV curing resin 11 would not wettingly spread to ooze out to the outside of the cam pattern 20, in other areas than the areas of the openings 21 of the dam pattern 20.

The openings 21 of the dam pattern 20 are provided for allowing bubbles inside the UV curing resin 11 to escape, at the time when the UV curing resin 11 wettingly spreads during the process of adhering the front panel 10 and the liquid crystal display panel 3 to each other.

When the front panel 10 and the liquid crystal display panel 3 are adhered together in the step 102 of FIG. 2, however, the UV curing resin 11 would wettingly spread, to ooze out to the outside of the dam pattern 20, in a circular form through each of the openings 21.

In view of this, the areas of the openings 21 of the dam pattern 20 are irradiated with UV rays for tentative curing, in the step 103 in FIG. 2. As a result, the UV curing resin 11 having oozed out in a circular pattern through each of the openings 21 of the dam pattern 20 is restrained from oozing out to the outside of the liquid crystal display panel 3.

As shown in FIGS. 3A and 3B, therefore, in the liquid crystal display device according to this embodiment, the UV curing resin 11 would not ooze out toward the outside of the liquid crystal display panel 3, in other areas than the areas of the four corners of the liquid crystal display panel 3. In each of the areas of the four corners of the liquid crystal panel 3, on the other hand, the UV curing resin 11 oozes outward in a circular form.

Thus, in this embodiment, the UV curing resin 11 is prevented from overflowing to the outside of the liquid crystal display panel 3. Therefore, it is possible to avoid the related-art problem about deposition of the UV curing resin 11 on a group of optical sheets in the backlight unit BKU due to an overflow of the UV curing resin 11 or problem about deposition of dirt due to movement of the assembly during handling thereof.

Now, referring to FIGS. 4A to 6B, detailed description will be made of the method of adhering together the front panel 10 and the liquid crystal display panel 3 in the liquid crystal display device according to this embodiment of the present invention.

As shown in FIG. 4A, in the step 101 in FIG. 2, the UV curing resin 11 is applied to the adherend surface of the front panel 10 by of a dispenser. The pattern of the UV curing resin 11 applied here is so configured that a bubble or bubbles will not be generated when the spreading UV curing resin 11 comes into contact with the dam pattern 20. In FIG. 4A, the UV curing resin 11 is applied in a pattern of dots. When the UV curing resin 11 is thus applied in the pattern of dots by use of a dispenser, the application time is so controlled that the area of the dot formed in a central area of the adherend surface of the front panel 10 will be the largest and that the area of a dot will be smaller as the dot is located farther from the center of the adherend surface.

In addition, as shown in FIG. 4B, in the step 105 in FIG. 2, a UV curing resin is applied by a dispenser to an area outside of an effective display region on the upper-side polarizing plate POL2 of id crystal display panel 3, followed by tentative curing of this resin, to form the dam pattern 20.

The dam pattern 20 is formed in a rectangular shape having rectilinear arts along the edges of the liquid crystal display panel 3 and having openings 21 in the four corner areas thereof. Incidentally, in this embodiment, the viscosity of the UV curing resin applied by the dispenser is, for example, 9,000 mPa·s.

As shown in FIG. 4D, the height Ho of the dam pattern 20 is so set as to satisfy the relation of $1.15 \times Hp \leq Ho \leq 1.25 \times Hp$, where Hp is the adhesion gap length between the front panel 10 and the liquid crystal display panel 3.

This ensures that even if variations in material thicknesses or variations in parallelism of the members adhered to each other are present, the height Ho of the dam pattern 20 is inhibited from becoming smaller than the adhesion gap length Hp, so that a margin can be allowed for the overflow of the UV curing resin.

The dam pattern 20 is disposed so as to ensure that when the front panel 10 and the liquid crystal display panel 3 are adhered to each other in the step 102 in FIG. 2, the UV curing resin 11 is prevented from wettingly spreading so as to overflow the outside of the dam pattern 20. In short, the dam pattern 20 is disposed in order to prevent the UV curing resin 11 from eventually overflowing to the outside of the liquid Crystal display panel 3.

In addition, the openings 21 of the dam pattern 20 are provided in order to ensure that when the front panel 10 and the liquid crystal display panel 3 are adhered to each other while allowing the UV curing resin 11 to wettingly spread in the step 102 in FIG. 2, bubbles inside the spreading UV curing resin 11 are allowed to escape to the outside.

Figure 7:
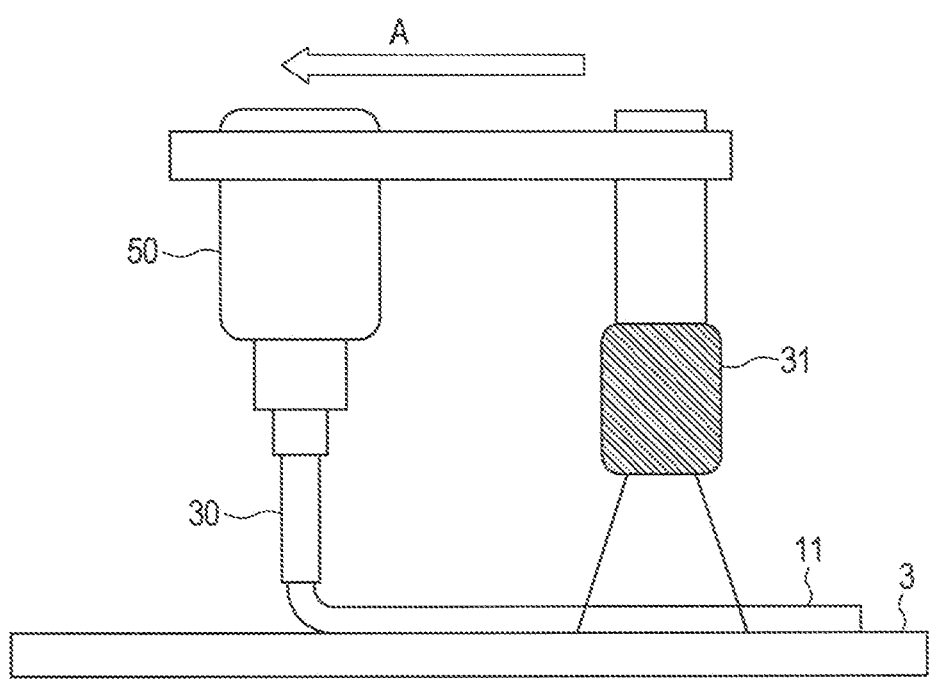
FIG. 7 illustrates a method of forming a dam pattern on the liquid crystal display panel in the liquid crystal display device according to the embodiment of the invention.

In forming the dam pattern 20, as shown in FIG. 7, a spot UV lamp (slit fiber) 31 disposed on the back side with respect to the moving direction (the direction of arrow A in FIG. 7) of a dam pattern-forming nozzle of the dispenser 50, and tentative curing of the dam pattern-forming resin by irradiation with UV rays is conducted immediately after dam pattern formation. Thus, the tentative curing is carried out for stabilizing the shape of the dam pattern 20 (the height and the application width of the dam pattern 20). The intensity of irradiation with the UV rays at the time of the tentative curing is set to within such a range as to enable the intended shape stabilization, while taking care not to effect complete curing of the resin.

Since the dam pattern 20 is in the tentatively cured state, it is ensured that when the front panel 10 and the liquid crystal display panel 3 are adhered to each other and pressed against each other, in the step 102 in FIG. 2, the dam pattern 20 can be worked (reduced in height) until its height is reduced to the adhesion gap length (Hp) between the front panel 10 and the liquid crystal display panel 3.

In the next place, when the front panel 10 and the liquid crystal display panel 3 are adhered to each other, as shown in FIG. 4C, in the step 102 in FIG. 2, specifically in the course of pressing the front panel 10 and the liquid crystal display panel 3 toward each other until the gap therebetween is reduced to the adhesion gap length Hp, as shown in FIG. 5C, the UV curing resin 11 flows to move toward the openings 21 of the dam pattern 20, as shown in FIGS. 5A and 5B.

Incidentally, in FIGS. 5A and 5B, the directions of flow of the UV curing resin 11 are indicated by arrows A.

In addition, as indicated by reference sign UV in FIG. 6A, in the step 103, the areas of the openings 21 of the dam pattern 20 are irradiated with UV rays for tentative curing. This results in that the UV curing resin 11 having oozed out through the openings 21 of the dam pattern 20 is inhibited from oozing out to the outside of the liquid crystal display panel 3, and the adhesion positions of the front panel 10 and the liquid crystal display panel 3 to each other are fixed.

Next, as shown in FIG. 6B, the front panel 3 and the liquid crystal splay panel 3 are pressed against each other until the gap therebetween is reduced to the adhesion can length Hp, whereby the dam pattern 20 is pressed down to the adhesion gap length Hp.

In this case, the dam pattern 20 may be formed from the same UV curing resin that applied in the step 101, whereby the influence of the resin material on the display quality of the finished product can be lessened.

Figure 8:
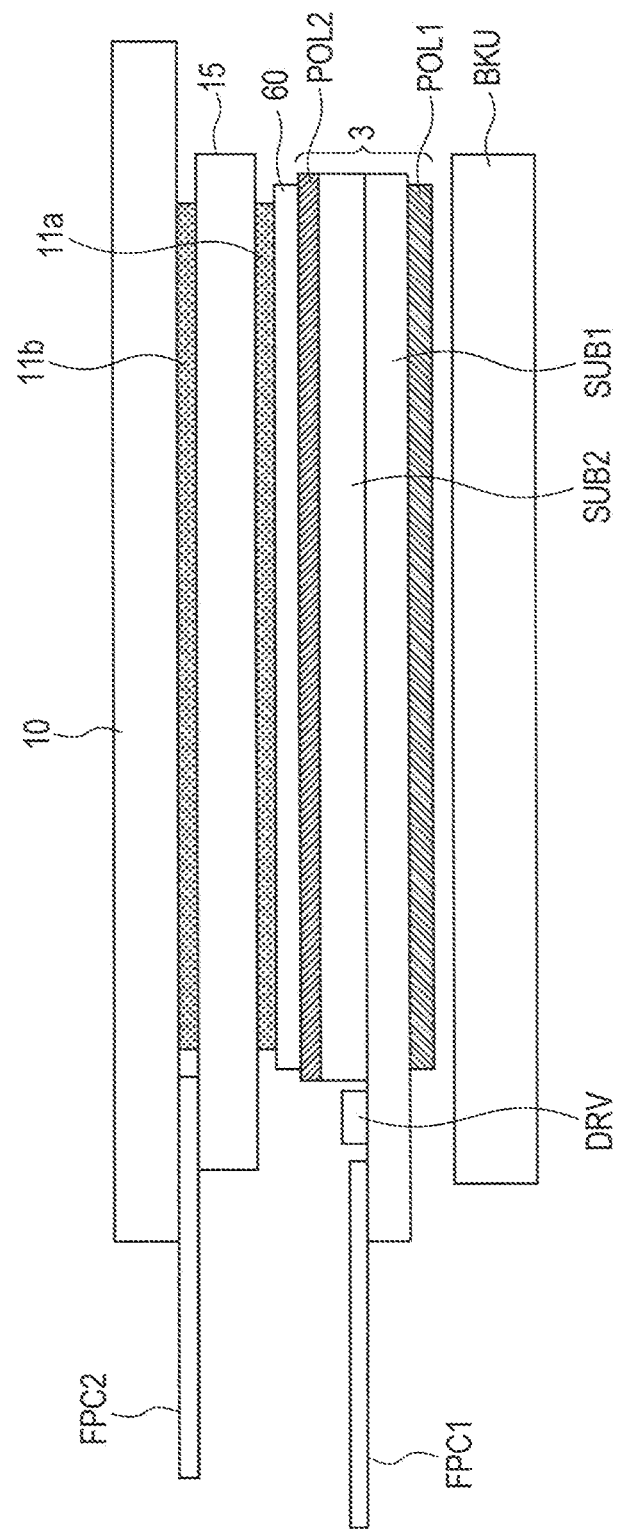
FIG. 8 is a side, view showing a general configuration of a modification of the liquid crystal display according to the embodiment of the invention.
Figure 9:
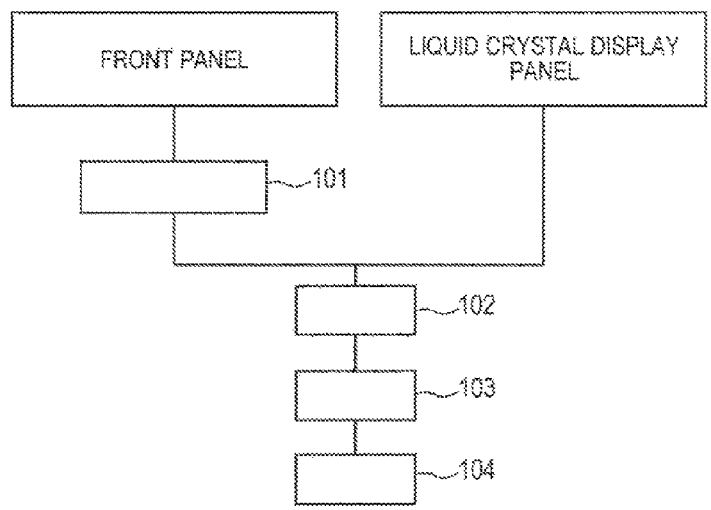
FIG. 9 illustrates a method of adhering together a front panel and a liquid crystal display panel, in a liquid crystal display device according to the relater art.
Figure 10:
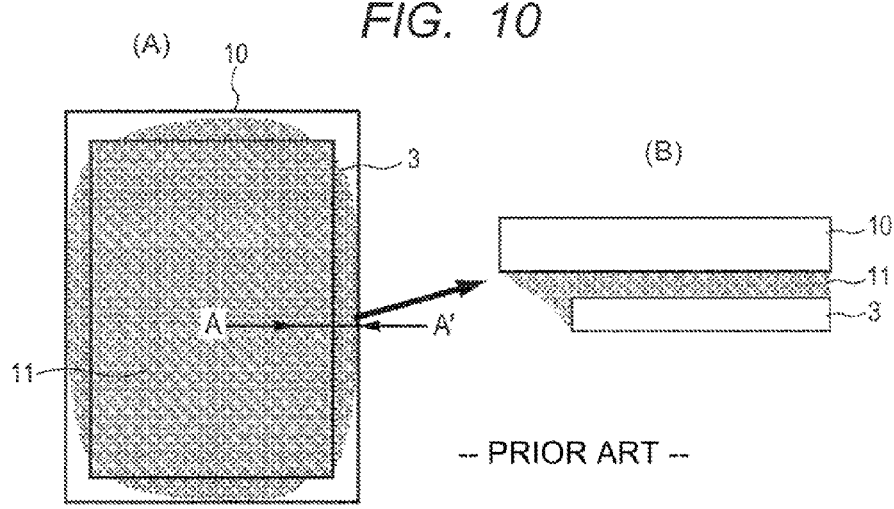
FIGS. 10A and 10B illustrate the front panel and the liquid crystal panel as adhered to each other by the method illustrated in FIG. 9

FIG. 8 is a side view showing a general configuration of a modification of the liquid crystal display device according to this embodiment of the present invention.

The liquid crystal display device shown in FIG. 8 has a configuration wherein a touch panel 15 is adhered onto a liquid crystal display panel 3 by a UV curing resin 11a, and a front panel 10 is adhered onto the touch panel 15 by a UV curing resin 11b. In FIG. 8, reference sign FPC2 denotes a flexible wiring board connected with the touch panel 15, and reference sign 60 denotes a conductive film for shielding.

In the liquid crystal display device shown in FIG. 8, also, at least either one of the pair of the touch panel 15 and the liquid crystal display panel 3 and the pair of the front panel 10 and the touch panel 15 is configured by the same adhesion method as described above.

In the liquid crystal display device shown in FIG. 8, therefore, the UV curing resin 11b does not ooze out toward the outside of the touch panel 15 in other areas than the four corner areas of the touch panel 15, while the UV curing resin 11b oozes outward in a circular form in each of the four corner areas of the touch panel 15.

Similarly, the UV curing resin 11a does not ooze out toward the outside of the liquid crystal display panel 3 in other areas than the four corner areas of the liquid crystal display panel 3, while the UV curing resin 11a oozes outward in a circular form in each of the four corner areas of the liquid crystal display panel 3.

Incidentally, while an embodiment in which the present invention is applied to a liquid crystal display device has been described hereinabove, this is not restrictive of the invention, and, naturally, the invention is applicable also to other types of display devices such as organic EL display devices.

While the invention by the present inventor has been specifically described based on the embodiment above, the invention is not to be restricted to the embodiment and, naturally, various modifications are possible within the scope of the gist of the invention.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. A display device comprising:
    a first panel;
    a second panel; and
    a UV curing resin adhering the first panel and the second panel to each other,
    wherein the UV curing resin has oozed outward in a circular form in each of four corner area of the second panel, and
    a dam pattern prevents the UV curing resin from being oozed out toward the outside of the second panel, in other areas than the four corner areas of the second panel.

2. The display device of claim 1,
    wherein the first panel is a front panel or a touch panel, and the second panel is a display panel.

3. The display device of claim 2,
    wherein the display panel includes a first substrate, a second substrate, and a liquid crystal layer sealed in between the first substrate and the second substrate.

4. The display device of claim 2,
    further comprising a lower-side polarizing plate adhered to the first substrate, and an upper-side polarizing plate adhered to the second substrate.

5. The display device of claim 1,
    wherein the display device further comprises a third panel, the first panel is a front panel,
    the second panel is a touch panel, and
    the third panel, is a display panel.

6. The display device of claim 5,
    wherein the UV curing resin has oozed outward in a circular form each of four corner areas of the third panel, and the UV curing resin has not oozed out toward the outside of the touch panel, in other areas than the four corner areas of the third panel.

7. The display device of claim 5,
    wherein the display panel includes a first substrate, a second substrate, and a liquid crystal layer sealed in between the first substrate and the second substrate.

8. The display device of claim 5,
    further comprising a lower-side polarizing plate adhered to the first substrate, and an upper-side polarizing plate adhered to the second substrate.

9. A method of producing a display device, comprising:
(a) a step of applying a UV curing resin, in a rectangular pattern with openings at four corners thereof, to a part outside of an effective display region of an adherend surface of either one of a first panel and a second panel;
(b) a step of irradiating the UV curing resin applied in the step (a) with UV rays to effect tentative curing of the UV curing resin applied in the step (a), thereby forming a dam pattern;
(c) a step of applying a UV curing resin to an adherend surface of the other of the first panel or the second panel;
(d) step of adhering the one panel and the other panel to each other;
(e) a step of irradiating, with respect to the one panel and the other panel adhered to each other n the step (d), four corner areas where the dam pattern has no been formed in the step (b) with UV rays to effect tentative curing of the UV curing resin applied in the step (c); and
(f) a step of irradiating the one panel and the other panel adhered to each other in the step (d) with UV rays to effect full curing of the UV curing resins.

10. The method of claim 9,
wherein the first panel is a front panel or a touch panel, and the second panel is a display panel.

11. The method of claim 10,
wherein the display panel includes a first substrate, a second substrate, and a liquid crystal layer sealed in between the first substrate and the second substrate.

12. The method of claim 11,
wherein the display panel includes a lower-side polarizing plate adhered to the first substrate, and an upper-side polarizing plate adhered to the second substrate.

13. The method of claim 9,
wherein the display device further comprises a third panel, the first panel is a front panel,
the second panel is a touch panel, and
the third panel is a display panel.

14. The method of claim 9,
wherein the height of the dam pattern formed in the step (b) is greater than the adhesion gap length between the one panel and the other panel.

15. The method of claim 9,
wherein a relation of $1.5 \times Hp \leq Ho \leq 1.25 \times Hp$ is satisfied, where Ho is the height of the dam pattern formed in the step (b), and Hp is the adhesion gap length between the one panel and the other panel.

16. The method of claim 9,
wherein the step (c) is a step of applying the UV curing resin to the adherend surface of the other panel it a pattern of dots,
wherein the area of the dot of the UV curing resin applied to a nearly central area of the adherend surface of the other panel is the largest, and the area of a dot of the UV curing resin applied to the adherend surface of the other panel is smaller as the dot is located farther from the center of the adherend surface.

* * * * *

UNITED STATES PATENT AND TRADEMARK OFFICE
CERTIFICATE OF CORRECTION

PATENT NO. : 9,201,260 B2
APPLICATION NO. : 14/077663
DATED : December 1, 2015
INVENTOR(S) : Shigemi Shitou et al.

Page 1 of 2

It is certified that error appears in the above-identified patent and that said Letters Patent is hereby corrected as shown below:

In the specification
Column 1, line 32, change "related, art" to --related art--;
Column 1, line 36, change "re:sin" to --resin--;
Column 1, line 46, change "snowing" to --showing--;
Column 1, line 51, change "T hen" to --Then--;
Column 1, line 64, change "rust" to --must--;
Column 2, lines 22-23, change "Accordingly concerning" to --Accordingly, concerning--;
Column 2, line 26, change "and, also to" to --and, also, to--;
Column 2, line 64, change "tentative during" to --tentative curing--;
Column 3, lines 31-32, change "curing rein" to --curing resin--;
Column 4, line 5, change "caring resin" to --curing resin--;
Column 4, line 38, change "side, view" to --side view--;
Column 4, line 43, change "relater" to --related--;
Column 4, line 57, change "Besides the following" to --Besides, the following--;
Column 5, line 24, change "POL2 or the" to --POL2 of the--;
Column 5, line 37, change "above; FIG. 3B" to --above; and FIG. 3B--;
Column 5, line 43, change "cam pattern 20" to --dam pattern 20--;
Column 6, line 19, change "by of a dispenser" to --by use of a dispenser--;
Column 6, line 33, change "POL2 of id" to --POL2 of the liquid--;
Column 6, line 36, change "rectilinear arts" to --rectilinear parts--;
Column 6, lines 54-55, change "overflow the outside" to --overflow to the outside--;
Column 6, line 58, change "Crystal" to --crystal--;
Column 7, line 1, change "nozzle of the" to --nozzle 30 of the--;
Column 7, line 36, change "front panel 3" to --front panel 10--;
Column 7, line 37, change "splay panel" to --display panel--;
Column 7, line 38, change "adhesion can length" to --adhesion gap length--;

In the claims
Claim 1, column 8, line 32, change "area" to --areas--;

Signed and Sealed this
Sixteenth Day of February, 2016

Michelle K. Lee
*Director of the United States Patent and Trademark Office*

CERTIFICATE OF CORRECTION (continued)
U.S. Pat. No. 9,201,260 B2

In the claims

Claim 5, column 8, line 53, change "third panel, is" to --third panel is--;

Claim 9, column 9, line 12, change "(d) step" to --(d) a step--;

Claim 9, column 9, line 15, change "other n the" to --other in the--;

Claim 9, column 9, line 16, change "has no been" to --has not been--;

Claim 15, column 10, line 15, change "$1.5 \times Hp \leq Ho \leq 1.25 \times Hp$" to --$1.15 \times Hp \leq Ho \leq 1.25 \leq Hp$--; and Claim 16, column 10, line 21, change "panel it a" to --panel in a--.